3,067,047
MOLECULAR CERMETS AND METHOD OF MAKING THE SAME

Menahem Merlub-Sobel, Jersey City, N.J., assignor to Curtiss-Wright Corporation, a corporation of Delaware
No Drawing. Filed Nov. 18, 1959, Ser. No. 853,695
3 Claims. (Cl. 106—55)

This invention relates to improved cermets, and more particularly to cermet compositions in which the components are evenly distributed and intimately mixed on a molecular level, and to the method of making such compositions.

It is well known that mixtures or semi-alloys of refractory materials with metals produce compositions having desirable properties for both electrical and mechanical uses. Such cermets partake of the heat resistance and hardness of the refractory material and the tensile strength and toughness of the metal. Cermets also make excellent electrical resistors, since the metal component thereof is an electrical conductor, and the ceramic component may be almost a complete insulator.

In the prior art, it has been customary to make cermets by mixing a finely ground ceramic composition, such as aluminum oxide, with a pulverized metal such as iron or nickel, and then pressing and sintering the mixture. Although these products of the prior art are useful for certain purposes, their utility is limited by the relatively large particle size of the components. It is common to use powdered alumina in which the particles are about 1 micron in diameter, the smallest practicably producible size by grinding. The metal component of the cermet may be in particles as large as −325 mesh; mixing must be very thorough, and at best the intimacy of mix is limited by the large size of the particles.

It is therefore an object of the present invention to provide a method of making cermet compositions having components of molecular particle size.

It is another object to provide cermet compositions having components intimately mixed at the molecular level.

A further object of this invention is to provide a method of making easily cermet compositions which could heretofore be produced only with great difficulty.

Yet another object is the provision of cermet compositions in which both components are simultaneously precipitated from a chemical compound.

The foregoing objects and others ancillary thereto will be readily understood on reading the following specification.

Satisfactory cermet compositions of powdered beryllium oxide or powdered aluminum oxide with powdered tungsten or powdered molybdenum have previously been very difficult to make, owing to the difficulty of getting an intimate mix with components of such greatly different density.

I have found that an intimate mix of beryllium oxide or aluminum oxide with either tungsten or molybdenum can be made, having particles of molecular size, by reacting a soluble salt of the refractory metal with a soluble salt of either tungsten or molybdenum to form an insoluble precipitate of a salt containing a refractory metal, oxygen, and one of the selected heavy metals, and reducing this compound by a reducing agent which forms a volatile oxide. Examples of such reducing agents are hydrogen, hydrocarbons, or carbon. Beryllium oxide and aluminum oxide are not reducible by such an agent, whereas both tungsten and molybdenum can be reduced by this means. Salts of an acidic oxide, such as nitrates, for example, are preferred as starting points, although halides or other salts may also be used.

The general equation for the first reaction is as follows:

$$MT + LZO_a \rightarrow \downarrow MZO_a + LT$$

where M is either aluminum or beryllium, T is the anion of an M salt, Z is either tungsten or molybdenum, $O_a$ is oxygen in the required amount, and L is any ion capable of forming a soluble salt with $ZO_a$ and with T.

The reduction reaction proceeds according to the general equation $$MZO_a + Q \rightarrow MO + Z + J$$

where Q is a reducing agent of the class specified above, and J is one or more volatile oxides. For the purposes of my invention water is considered a volatile oxide. The resultant composition of MO+Z is a combination of particles of molecular size of beryllium oxide or aluminum oxide with tungsten or molybdenum, intimately mixed and dispersed at the molecular level, and suitable for pressing and sintering by well-known methods to form cermets of very high quality.

Following are idealized equations for specific cermet compositions made according to my invention.

*Example I*

$$2Al(NO_3)_3 + 3(NH_4)_2WO_4 \rightarrow \downarrow Al_2(WO_4)_3 + 6NH_4NO_3$$
$$Al_2(WO_4)_3 + 9H_2 \rightarrow Al_2O_3 + 3W + 9H_2O$$

Although in this example aluminum nitrate is given as one of the starting compounds, it will be understood that according to the general equation another soluble salt of aluminum may be used, such as aluminum sulfate or aluminum chloride, for example. Similarly, in place of ammonium tungstate I may use any soluble tungstate of which the cation forms a soluble salt with the anion of the aluminum salt selected, such as potassium tungstate.

*Example II*

$$2Al(NO_3)_3 + 3(NH_4)_2MoO_4 \rightarrow \downarrow Al_2(MoO_4)_3 + 6NH_4NO_3$$
$$Al_2(MoO_4)_3 + 9H_2 \rightarrow Al_2O_3 + 3Mo + 9H_2O$$

The same equivalents apply in this example as in Example I.

*Example III*

$$BeCl_2 + Na_2MoO_4 \rightarrow \downarrow BeMoO_4 + 2NaCl$$
$$BeMoO_4 + CH_4 \rightarrow BeO + Mo + CO + 2H_2O$$

Again, in place of beryllium chloride I may use any soluble salt of beryllium, such as beryllium bromide or beryllium nitrate, for instance, and instead of sodium molybdate I may use any soluble molybdate of which the cation forms a soluble salt with the anion of the selected beryllium compound.

*Example IV*

$$BeCl_2 + Na_2WO_4 \rightarrow \downarrow BeWO_4 + 2NaCl$$
$$BeWO_4 + CH_4 \rightarrow BeO + W + CO + 2H_2O$$

The same equivalents apply in this example as in Examples I, II, and III, according to the general equation.

Although in the four specific examples given above only hydrogen and methane have been exemplified as reducing agents, carbon or other hydrocarbons may be used. When using carbon, particular care must be taken to provide stoichiometric amounts and to control the reaction, in order that no undesirable carbon residue may remain in the product. It will be understood that in the idealized equations given above, the insoluble precipitate of the first reaction of each example may not always be a true compound as shown, but may contain hydrates or hydroxides. This does not affect the chemistry of the procedure, since such compounds are reducible by the same agents in the same manner.

It may sometimes be desirable to adjust the proportions of the molecular cermet compositions to contain more or less of the refractory oxide or the free metal.

This can be accomplished by using an overage of one or the other of the starting salts, balancing the amount of the overage with a salt which will form an insoluble precipitate of the desired metal and remove the anion in the filtrate. The following equations will exemplify this reaction.

Example V

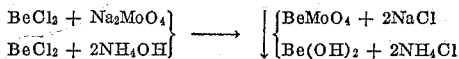

The two precipitates come down simultaneously in molecular dispersion, and are treated by a reducing agent as previously discussed, leaving a double proportion of beryllium oxide to free molybdenum.

Example VI

Again, the molecular precipitates come down simultaneously, and are treated with the reducing agent to leave a cermet composition having a double proportion of molybdenum to beryllium oxide. It will be obvious that any desired proportion of the two components of the cermet composition can be achieved by adjusting the proportions of the starting salts.

Although I have described my invention above in a preferred form, it will be understood by those skilled in the art that various changes and modifications may be made without departing from the scope of the invention.

It is intended to cover all such modifications by the appended claims.

What is claimed is:

1. The process of making cermet compositions, comprising reacting an aqueous solution of a first salt of a first metal selected from the group consisting of aluminum and beryllium with an aqueous solution of a second salt of a second metal selected from the group consisting of molybdenum and tungsten, at least one of said first and second salts containing oxygen, said second salt having a cation forming a soluble salt with the anion of said first salt, said second metal being in the anion of said second salt, said anion of said second salt forming with the cation of said first salt an insoluble molecular precipitate of a third salt containing said first and second metals and oxygen, and selectively reducing said second metal in said third salt by a reducing agent selected from the group consisting of hydrogen, methane, and carbon to form a cermet composition consisting of a refractory oxide of said first metal in molecular contact with said second metal in a free state.

2. The process recited in claim 1, wherein said second salt has a tungstate anion.

3. The process recited in claim 1, wherein said second salt has a molybdate anion.

References Cited in the file of this patent

FOREIGN PATENTS

| | | |
|---|---|---|
| 668,682 | Great Britain | Mar. 19, 1952 |
| 710,562 | Great Britain | June 16, 1954 |
| 553,427 | Canada | Feb. 18, 1958 |